US012718266B1

(12) United States Patent
Kaiser et al.

(10) Patent No.: US 12,718,266 B1
(45) **Date of Patent: *Aug. 25, 2026**

(54) SYSTEM AND METHOD FOR AUTOMATIC GENERATION AND DELIVERY OF PERSONALIZED CONTENT

(71) Applicant: WALGREEN CO., Deerfield, IL (US)

(72) Inventors: Matthew James Kaiser, Chicago, IL (US); Gregory John Damler, Crystal Lake, IL (US)

(73) Assignee: WALGREEN CO., Deerfield, IL (US)

(*) Notice: Subject to any disclaimer, the term of this patent is extended or adjusted under 35 U.S.C. 154(b) by 94 days.

This patent is subject to a terminal disclaimer.

(21) Appl. No.: 18/639,286

(22) Filed: Apr. 18, 2024

Related U.S. Application Data

(63) Continuation of application No. 17/145,928, filed on Jan. 11, 2021, now Pat. No. 12,014,395.

(51) Int. Cl.
*G06Q 30/0251* (2023.01)
*G06F 9/54* (2006.01)

(52) U.S. Cl.
CPC ......... *G06Q 30/0253* (2013.01); *G06F 9/547* (2013.01); *G06Q 30/0251* (2013.01)

(58) Field of Classification Search
CPC . G06Q 30/0253; G06Q 30/0251; G06F 9/547
USPC ......... 705/14.51, 14.72, 14.58, 14.46, 14.49, 705/14.66, 14.55; 455/414.1; 726/28
See application file for complete search history.

(56) References Cited

U.S. PATENT DOCUMENTS 4,652,990 A 3/1987 Pailen et al.
8,086,253 B1 12/2011 Kalamkar et al.
8,311,890 B2 11/2012 Donovan et al.
9,641,632 B1 * 5/2017 Torrance ............... H04L 67/535
10,657,556 B1 5/2020 Lu et al.
2002/0026360 A1 2/2002 McGregor et al.
(Continued)

FOREIGN PATENT DOCUMENTS

WO WO-2010041217 A2 * 4/2010 ............. H04L 47/70

OTHER PUBLICATIONS

Frederik Nielsen, Email Marketing is Still The Most Effective Channel in 2020, 2020 (Year: 2020).*
(Continued)

*Primary Examiner* — Tarek Elchanti
(74) *Attorney, Agent, or Firm* — MARSHALL, GERSTEIN & BORUN LLP

(57) ABSTRACT

Techniques for delivery of personalized content are provided. An example method includes detecting that a delivery server invoked an API in response to detecting that a client device is accessing an email formatted according to a template, and provided to the client device by the delivery server; receiving a request for a set of offers including a user identifier associated with a user of the client device, offer query criteria based on the template, and an indication of a preferred model from which offers of the set of offers should be generated; building the set offers by retrieving candidate offers specific to the user generated by a machine learning model, and an identification of a model used to generate each offer, and retrieving a rank of each candidate offer; and transmitting the offers to the delivery server to populate the email with content corresponding to the offers.

14 Claims, 5 Drawing Sheets

(56) References Cited

U.S. PATENT DOCUMENTS

2002/0120932 A1 8/2002 Schwalb
2005/0096920 A1 5/2005 Matz et al.
2006/0131412 A1 6/2006 O'Brien et al.
2007/0112633 A1 5/2007 Walker et al.
2008/0059285 A1 3/2008 Hamoui
2009/0171747 A1* 7/2009 Lanning .................. G06F 21/10 726/28
2009/0171948 A1 7/2009 Solomon et al.
2010/0017294 A1* 1/2010 Mancarella ........... H04L 51/063 705/14.55
2010/0082432 A1 4/2010 Feng et al.
2010/0198694 A1 8/2010 Muthukrishnan
2011/0055000 A1 3/2011 Zhang et al.
2012/0166267 A1 6/2012 Beatty et al.
2012/0198539 A1 8/2012 Liu et al.
2013/0024290 A1 1/2013 Berg et al.
2013/0047062 A1 2/2013 McElfresh et al.
2013/0159110 A1 6/2013 Rajaram et al.
2013/0204715 A1 8/2013 Zhang
2013/0297409 A1 11/2013 Jones et al.
2014/0147048 A1 5/2014 Yang et al.
2014/0278940 A1 9/2014 Wade
2015/0100415 A1 4/2015 Yu et al.
2015/0294371 A1 10/2015 Agrawal
2016/0189146 A1 6/2016 Cattone
2016/0379279 A1* 12/2016 Ashery .............. G06Q 30/0277 705/14.72
2018/0040031 A1 2/2018 Wilson et al.
2018/0097759 A1 4/2018 Brechbuhl et al.
2018/0121953 A1* 5/2018 Zhang ................ G06Q 30/0254
2019/0065911 A1 2/2019 Lee et al.
2020/0242483 A1 7/2020 Shashikant Rao et al.
2021/0110417 A1 4/2021 Lade
2022/0182493 A1 6/2022 Ter et al.

OTHER PUBLICATIONS

The Free Dictionary, Model, Jul. 25, 2022, Farlex, all (Year: 2022).

* cited by examiner

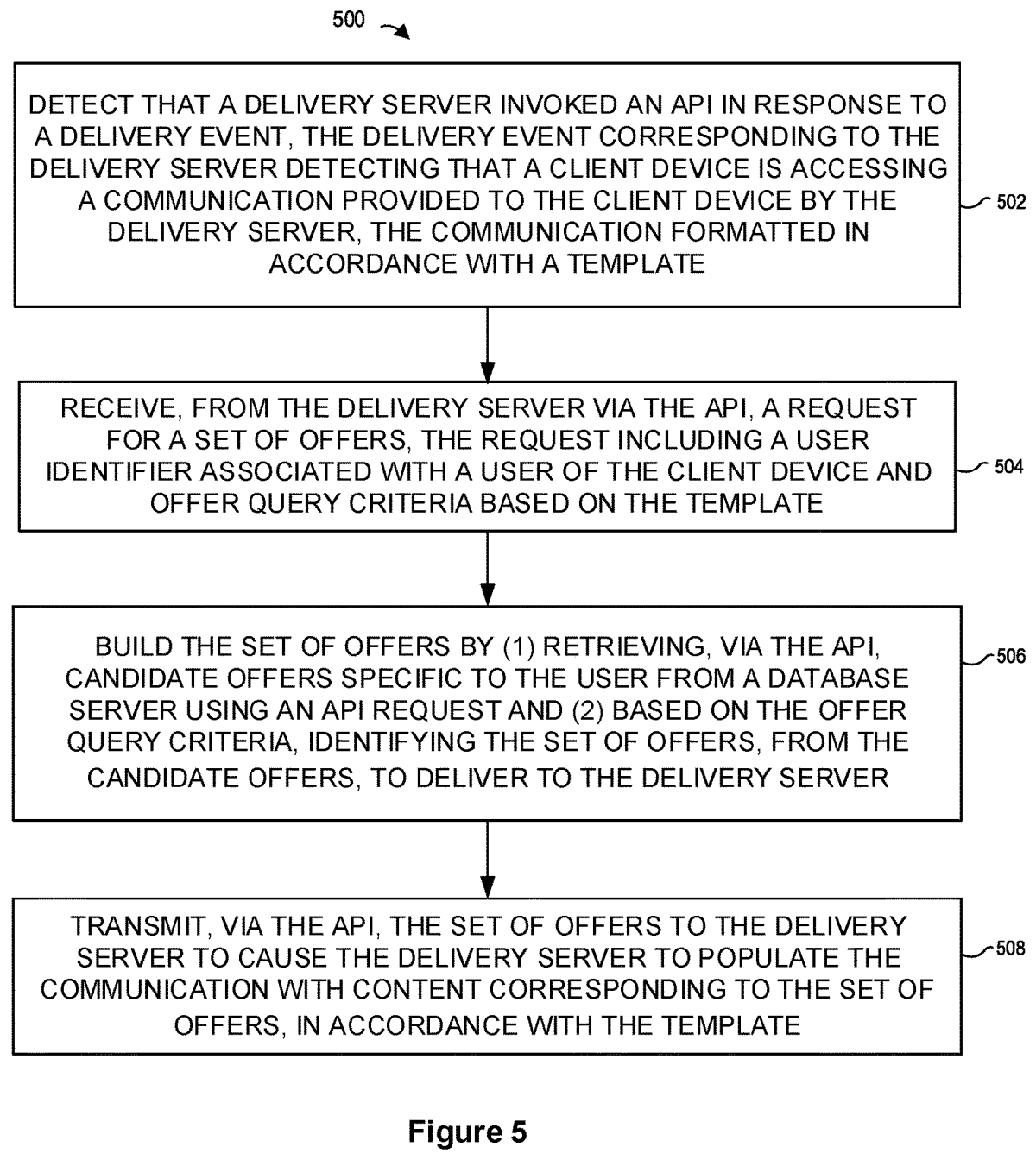

500

DETECT THAT A DELIVERY SERVER INVOKED AN API IN RESPONSE TO A DELIVERY EVENT, THE DELIVERY EVENT CORRESPONDING TO THE DELIVERY SERVER DETECTING THAT A CLIENT DEVICE IS ACCESSING A COMMUNICATION PROVIDED TO THE CLIENT DEVICE BY THE DELIVERY SERVER, THE COMMUNICATION FORMATTED IN ACCORDANCE WITH A TEMPLATE — 502

RECEIVE, FROM THE DELIVERY SERVER VIA THE API, A REQUEST FOR A SET OF OFFERS, THE REQUEST INCLUDING A USER IDENTIFIER ASSOCIATED WITH A USER OF THE CLIENT DEVICE AND OFFER QUERY CRITERIA BASED ON THE TEMPLATE — 504

BUILD THE SET OF OFFERS BY (1) RETRIEVING, VIA THE API, CANDIDATE OFFERS SPECIFIC TO THE USER FROM A DATABASE SERVER USING AN API REQUEST AND (2) BASED ON THE OFFER QUERY CRITERIA, IDENTIFYING THE SET OF OFFERS, FROM THE CANDIDATE OFFERS, TO DELIVER TO THE DELIVERY SERVER — 506

TRANSMIT, VIA THE API, THE SET OF OFFERS TO THE DELIVERY SERVER TO CAUSE THE DELIVERY SERVER TO POPULATE THE COMMUNICATION WITH CONTENT CORRESPONDING TO THE SET OF OFFERS, IN ACCORDANCE WITH THE TEMPLATE — 508

Figure 5

SYSTEM AND METHOD FOR AUTOMATIC GENERATION AND DELIVERY OF PERSONALIZED CONTENT

CROSS-REFERENCE TO RELATED APPLICATIONS

The present application is a continuation of, and claims the benefit of, U.S. patent application Ser. No. 17/145,928, entitled "SYSTEM AND METHOD FOR AUTOMATIC GENERATION AND DELIVERY OF PERSONALIZED CONTENT," filed Jan. 11, 2021, which is hereby expressly incorporated by reference herein in their entirety.

FIELD OF THE DISCLOSURE

The present disclosure generally relates to real-time delivery of personalized content and, more particularly, to computer-implemented methods and systems for automatic generation and delivery of personalized content.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Retailers commonly offer sales, coupons, and/or rebates to incentivize customers to purchase various products. Such offers are generally determined based on aggregate customer data that suggests offers to which a broad group of customers may respond positively. Offers are not generally designed specifically for a particular customer. As a result, the offers may not incentivize each particular customer.

Further, even if a retailer were to identify targeted offers for each customer, there are technical challenges in actually implementing digital advertising campaigns that utilize the targeted offers. For example, identifying personalized offers for an entire customer base, which may include millions of customers, and disbursing such personalized offers may be impracticable due to scaling challenges. Further, the timing of an offer may affect the efficacy of the offer. A targeted offer for a customer, for example, may be based on outdated customer data, such that, by the time the customer data is analyzed, a targeted offer is generated, and the targeted offer is delivered to the customer, the targeted offer may no longer be relevant or motivating to the customer. Further, scaling challenges may further exacerbate this timing issue. Providing personalized offers on a large scale may require increased time for data transfer and data analysis, yet the increased time may cause the personalized offers to be less effective.

Accordingly, there is a need for improved systems and methods that enable mass-personalization of offers and on-demand disbursement of personalized offers to customers in an efficient, timely manner.

SUMMARY

Generally speaking, the present disclosure provides technologies for on-demand, real-time delivery of personalized content. In accordance with one example aspect of the present disclosure, a method for real-time delivery of personalized content is provided. The method may be performed by one or more processors of an application programming interface (API) server that implements an API. The method includes detecting that a delivery server invoked the API in response to a delivery event, the delivery event corresponding to the delivery server detecting that a client device is accessing a communication provided to the client device by the delivery server, the communication formatted in accordance with a template. The method also includes receiving, via the API, a request for a set of offers, the request including a user identifier associated with a user of the client device and offer query criteria based on the template. The method further includes building the set of offers by: retrieving, via the API, candidate offers specific to the user from a database server using an API request; and, based on the offer query criteria, identifying the set of offers, from the candidate offers, to deliver to the delivery server. The method also includes transmitting, via the API, the set of offers to the delivery server to cause the delivery server to populate the communication with content corresponding to the set of offers, in accordance with the template, wherein the client device displays the communication including the content when the client device accesses the communication.

In accordance with another exemplary aspect of the present disclosure, an API server is provided including one or more processors, a non-transitory computer-readable medium, and instructions stored on the computer-readable medium that implement an API. The instructions, when implemented by the one or more processors, cause the API server to detect that a delivery server invoked the API in response to a delivery event, the delivery event corresponding to the delivery server detecting that a client device is accessing a communication provided to the client device by the delivery server, the communication formatted in accordance with a template. The instructions also cause the API server to receive, via the API, a request for a set of offers, the request including a user identifier associated with a user of the client device and offer query criteria based on the template. The instructions further cause the API server to build the set of offers by retrieving, via the API, candidate offers specific to the user from a database server using an API request; and, based on the offer query criteria, identifying the set of offers, from the candidate offers, to deliver to the delivery server. The instructions also cause the API server to transmit, via the API, the set of offers to the delivery server to cause the delivery server to populate the communication with content corresponding to the set of offers, in accordance with the template, wherein the client device displays the communication including the content when the client device accesses the communication.

In accordance with yet another exemplary aspect of the present disclosure, a non-transitory computer-readable medium is provided that stores thereon instructions that implement an API for real-time delivery of personalized content. The API is configured to detect that a delivery server invoked the API in response to a delivery event, the delivery event corresponding to the delivery server detecting that a client device is accessing a communication provided to the client device by the delivery server, the communication formatted in accordance with a template. The API is also configured to receive, from the delivery server, a request for a set of offers, the request including a user identifier associated with a user of the client device and offer query criteria based on the template. The API is further configured to build the set of offers by: retrieving candidate offers specific to the user from a database server using an API request; and based on the offer query criteria, identifying the set of offers, from the candidate offers, to deliver to the delivery server. The API is further configured to transmit the set of offers to the delivery server to cause the delivery server to populate the communication with content corresponding to the set of offers, in accordance with the template, wherein the client device displays the communication including the content when the client device accesses the communication.

In various embodiments, receiving the user identifier from the delivery server may include receiving the user identifier in an encrypted form, and decrypting the user identifier.

In some embodiments, receiving the offer query criteria includes receiving an indication of one or more zones of the communication to be populated using the set of offers. Receiving the offer criteria may include receiving a quantity of offers to be populated in each zone of the one or more zones, and identifying the set of offers may include filtering the candidate offers based on the quantity of offers. Further, receiving the candidate offers may include retrieving, for each candidate offer of the candidate offers, one or more candidate zones to which the candidate offer corresponds, and identifying the set of offers may include filtering the candidate offers based on whether the one or more candidate zones of each of the candidate offers are included in the one or more zones. Still further, receiving the candidate offers may include retrieving, for each candidate offer of the candidate offers, a rank of the candidate offer based on an estimated affinity of the user for the candidate offer, and identifying the set of offers may include sorting the candidate offers based on ranks of the candidate offers and identifying the set of offers based on the sorting.

In addition, in some embodiments, the offer query criteria includes preferred product categories to which the set of offers should correspond. In such implementations, retrieving the candidate offers includes retrieving, for each candidate offer of the candidate offers, a product category of the candidate offer. Identifying the set of offers may then include filtering the candidate offers based on the product categories of the candidate offers and the preferred product categories.

Further, in some embodiments, retrieving the candidate offers may include retrieving, for each candidate offer of the candidate offers, an offer key that identifies the candidate offer and a product that identifies a product of an enterprise that is recommended for the user. Retrieving the candidate offers may include querying, via the API, the database server for the candidate offers using the API request, the API request including the user identifier, and receiving, via the API, the candidate offers in response to the API request. In some embodiments, retrieving the candidate offers includes retrieving the candidate offers generated by a machine learning model trained on historical data indicative of a plurality of interactions of a plurality of users with a retailer associated with the set of offers.

In some embodiments, the API server may transmit, via the API, an indication of the set of offers to at least one of the database server or one or more computing devices that implement the machine learning model.

Further, depending on the implementation and/or scenario, the communication may be any suitable communication, such as an email, a text message, a webpage, a digital advertisement, an in-store advertisement, or an instance of a graphical user interface (GUI) of an application.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawing arrangements which are presently discussed, it being understood, however, that the present examples are not limited to the precise arrangements and instrumentalities shown, wherein:

FIG. 5 is a flow diagram of an example method for real-time delivery of personalized content, in accordance with some embodiments.

DETAILED DESCRIPTION

Overview

Figure 1:
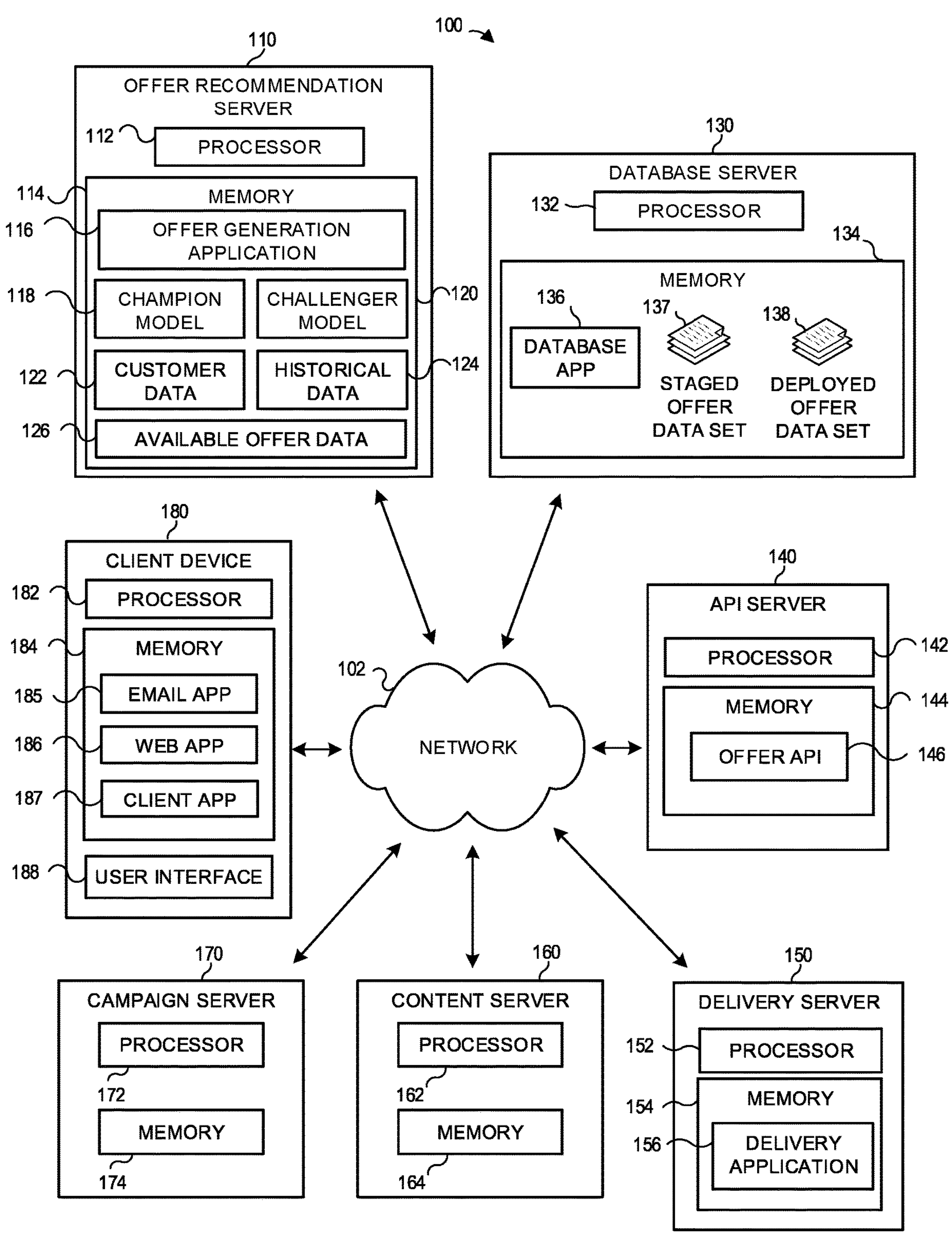
FIG. 1 is a block diagram of an example computing system in which techniques for on-demand, real-time delivery of personalized content may be implemented, in accordance with some embodiments.

The present application provides an automated system for building and disbursing personalized offers. Personalized offers (e.g., incentives for interacting with an enterprise, such as a retailer) can be generated for a user based on prior user interactions with an enterprise. These personalized offers can be stored in a database accessible by an API, where the database can be updated based on new personalized offers generated using updated data. A communication, such as an email, formatted in accordance with a template may be provided to a client device by a delivery server. Upon detecting a delivery event corresponding to the client device accessing the communication, the delivery server can call the API to retrieve the personalized offers specific for the user of the client device. The API can retrieve the personalized offers from the database and provide the personalized offers to the delivery server. The delivery server can then render content corresponding to the personalized offers in the communication, such that when the client device displays the communication, the communication displays the content. Accordingly, the content of the communication is determined and rendered dynamically between when the client device detects that a user is attempting to access a communication and when the client device displays the communication (e.g., between when a user interacts with the client device to open an email and when the client device displays the email).

The systems and methods of the present disclosure offer numerous benefits. In particular, the techniques of this disclosure represent improvements to technologies for generating, storing, disbursing, and rendering on-demand personalized content. Personalized offers designed to incentivize a specific customer are generated (e.g., using rules-based and/or machine-learning based models) based on current customer data representing the most recently-available interactions of the customer with an enterprise. These personalized offers are then loaded into a database, which is refreshed with updated personalized offers in accordance with the techniques discussed below, where the personalized offers can be retrieved by an API. Up-to-date personalized offers are therefore available, at-scale, when requested by the API.

Communications that are to be populated based on the personalized offers can initially be transmitted to a client device of a user without content. Communications can therefore be transmitted to a mass customer list without requiring the content for each communication to be individually generated and stored prior to transmission. Thus, each communication has a smaller data size compared to if the communication were transmitted with content. Further, content need only be rendered (and thus processing power consumed) if a client device accesses the communication. When a client device does attempt to access the communication (e.g., an email), a delivery server can call the API in order to retrieve personalized offers for the user of the client device. After receiving the personalized offers, the delivery server can render content corresponding to the particular personalized offers in real-time, upon the client device accessing the communication. Accordingly, when the client device displays the communication (e.g., displays the email), the client device displays content corresponding to the personalized offers. The personalized offers are both specific to the user, and up-to-date based on the most-recently available customer data regarding the user. Content is dynamically populated into the communication, upon request, using these personalized offers.

As used herein, the term "product" generally refers to an item or a service that is provided by an enterprise. The term "offer," as used herein, generally refers to an incentive, directed at a customer, to purchase a product provided by an enterprise. For example, an incentive may include a discount on an indicated or listed price of a product, a free or discounted second product with the purchase of a first product, an increase in a rewards or loyalty account of a customer with the enterprise upon the purchase of a product, an offer of a different and/or additional incentive which is to be awarded to a customer upon completion of a specified customer action or interaction (e.g., providing an email address, providing a review, posting on social media, answering a survey, ordering a product online for pick-up or delivery, etc.) and/or any other suitable incentives designed to motivate a customer to purchase a product and/or continue interacting or engaging with the enterprise. As will be discussed in more detail below, "transmitting" an offer may refer to transmitting an identification of an offer, where the identification may include information related to the offer or a location of where to access information related to the offer. Except where otherwise noted, the term "real-time" refers to the rendering of content for a communication between when the communication is accessed and when the communication is displayed (e.g., between when an email is opened and the email is displayed). For example, "real-time" can refer to a time period of less than one second.

Further, while this disclosure primarily refers to examples of "offers," the techniques of this disclosure can be applied outside the advertising or marketing context. For example, "offers" can be replaced by any recommended content (e.g., media content such as videos, imagery, text, etc.) for a user. Recommended content can be determined for a user, indications of the recommended content can be stored in a database, and a delivery application can call an API to retrieve the indications of the recommended content. The delivery application can then render the content corresponding to the recommended content, in real-time upon a delivery event.

Example Computing Environment

FIG. 1 is a block diagram of an example computing system 100 in which the techniques of this disclosure for on-demand, real-time delivery of personalized content may be implemented. The computing system 100 includes several computing devices communicatively coupled via a network 102. The computing devices of the computing system 100 may include: an offer recommendation server 110, a database server 130, an application programming interface (API) server 140, a delivery server 150, a content server 160, a campaign server 170, and a client device 180. The servers 110, 130, 140, 150, 160, and 170 may be associated with an enterprise, such as a vendor, retailer, merchant, pharmacy, or other business entity which provides goods and/or services to customers. Alternatively, the servers 110, 130, 140, 150, 160 may be associated with different entities. For example, the offer recommendation server 110, the database server 130, the API server 140, and the campaign server 170 may be associated with (i.e., owned and/or operated by) the enterprise, and the delivery server 150, and the content server 160 may be associated with one or more third-party entities different from the enterprise. The client device 180 may be associated with a user, who may be a customer of the enterprise. In this disclosure, "the enterprise" refers to an enterprise associated with the offers provided to users via the techniques disclosed herein.

The network 102 in general can include one or more wired and/or wireless communication links and may be a proprietary network, a secure public internet, a virtual private network, or some other type of network, such as dedicated access lines, telephone lines, satellite links, cellular data networks, combinations of these, etc. Where the network 102 comprises the Internet, data communications may take place over the network 102 via an Internet communication protocol.

Each of the offer recommendation server 110, the database server 130, the API server 140, the delivery server 150, the content server 160, and the campaign server 170 may include multiple computing devices. Further, the functions of one or more of the servers 110, 130, 140, 150, 160, and 170 may be distributed among different computing devices, not only residing within a single machine, but deployed across a number of machines. For example, in some embodiments, one or more of the servers 110, 130, 140, 150, 160, and 170 may comprise multiple servers, which may comprise multiple, redundant, or replicated servers as part of a server farm. In some embodiments, one or more of the servers 110, 130, 140, 150, 160, and 170 may be implemented as cloud-based servers, such as a cloud-based computing platform. For example, one or more of the servers 110, 130, 140, 150, 160, and 170 may be any one or more cloud-based platform(s) such as MICROSOFT AZURE, AMAZON AWS, or the like.

The offer recommendation server 110 includes one or more processor(s) 112 and a memory 114. The one or more processor(s) 112 can include one or more general-purpose processors (e.g., central processing units (CPU(s)) or special-purpose processing units capable of executing machine-readable instructions stored on the memory 114. The memory 114 may be a non-transitory memory and may include one or several suitable memory modules, such as random access memory (RAM), read-only memory (ROM), flash memory, other types of persistent memory, etc. In addition, the offer recommendation server 110 (as well as the other servers 130, 140, 150, 160, and 170 may include components not shown in FIG. 1, such as a display, a user interface, an input/output (I/O) interface, an operating system (OS), and/or one or more communication interfaces such as hardware, software, and/or firmware enabling communication via the network 102.

The offer recommendation server 110 implements an offer generation application 116, which may be stored as executable instructions on the memory 114. The offer generation application 116 is configured to generate user-specific offers for customers of the enterprise, as will be discussed in more detail with reference to FIG. 2. In this disclosure, customers of the enterprise, or potential customers of the enterprise, are sometimes referred to as "users." To generate the offers, the offer generation application 116 may apply one or more models, such as a champion model 118 or a challenger model 120, to customer data 122. Each model utilized by the offer generation application 116 may be a rules-based model, a machine learning model trained using historical data 124, or a model that utilizes a combination of rules-based and machine learning or artificial intelligence (AI)-based techniques. In addition to the customer data 122, the one or more models that the offer generation application 116 can apply may also take as input available offer data 126. The available offer data 126 indicates offers that the offer generation application 116 may select from, as well as products (e.g., of the enterprise) that may be associated with the generated offers.

An example model of the offer generation application 116 may be a neural network, deep learning model, machine learning model, or other artificial intelligence model trained using the historical data 124. Training the example model may involve training the example model to identify and recognize patterns in existing data in order to facilitate making predictions for subsequent data. For example, a gradient-based training algorithm (e.g., a stochastic gradient descent algorithm), supervised learning, unsupervised learning, reinforcement learning, or any other suitable training method may be applied by the offer generation application 116 in order to train an example model. However, an example model may utilize a rules-based approach instead of or in addition to machine learning techniques. For instance, an example model may comprise pre-determined rules that generate recommended offers based on the customer data 122 and the available offer data 126.

The champion model 118 may be a model that the offer generation application 116 estimates to currently have the "best" performance of the models of the offer generation application 116, where performance of a model refers to how the model performs against performance metrics. An example performance metric is how incentivizing an offer generated by the model is, i.e., a likelihood that a generated offer will cause the user to interact with the enterprise. The challenger model 120 may be a model that is currently in development. For ease of explanation, this disclosure refers to a singular challenger model 120, but there may be multiple challenger models currently being generated and trained by the offer generation application 116. If the challenger model 120 outperforms the champion model 118 (e.g., based on performance estimates made using the historical data 124), the offer generation application 116 may replace the champion model 118 with the challenger model 120, and may replace the existing challenger model 120 with another model that is in development.

The offer generation application 116 may include various modules, such as a model training module, an offer generator module, and an output module that perform various functions of the offer generation application 116. For example, the model training module may train models using the historical data 124 and manage the champion model 118 and the challenger model 120. The offer generator module may apply models such as the champion model 118 to the customer data 122 in order to generate user-specific offers. The output module may transform offers generated by the offer generator module into a format that is ingestible by other applications, such as a database application 136.

The customer data 122 includes data to which the offer generation application 116 will apply models have been deployed by the offer generation application 116 (e.g., models that have been trained using the historical data 124), in order to generate offers predicted to be most incentivizing to individual users. For example, for a particular customer, the customer data 122 may include the most recent interactions of customers with the enterprise (e.g., interactions within the last hour, data, year, etc.). There may be overlap between the customer data 122 and the historical data 124 (i.e., the interactions included in the customer data 122 may also be included in the historical data 124 used to train the models). The customer data 122 may be received at the offer recommendation server 110, or at a database accessible by the offer recommendation server 110, from various data feeds. The customer data 122 may be continuously updated, periodically updated, and/or updated when the offer recommendation server 110 receives a push from a data feed to which the offer recommendation server 110 is subscribed.

A customer interaction is an interaction taken by a customer or user to interact and/or engage with the enterprise in some manner, such as accessing a website associated with the enterprise, opening an instance of a client application (e.g., a client application 187, discussed below), navigating to various portions of the website or client application associated with the enterprise, sending an email or chat to the enterprise, scanning an item at an in-store kiosk in a storefront location associated with the enterprise, purchasing a product or the enterprise, interacting with or redeeming an offer of the enterprise, using a loyalty or rewards account of the enterprise, clipping or redeeming a coupon, digitally browsing products offered by the enterprise, etc. The types of data included in the customer data 122 may include data indicative of customer interactions with the enterprise, such as customer identities, customer characteristics, types of interactions, locations of interactions, times/days/dates on which the interactions occurred, contents of interactions, product(s) associated with interactions, respective time intervals elapsing between a group of ordered interactions, respective results or outcomes of sets of one or more interactions (e.g., purchase of an item corresponding to the interaction at a respective price, purchase of another item at a respective price, whether or not any incentives were utilized, whether any items were saved (e.g., in a digital cart or digital shopping list)), etc.

The customer data 122 may also include data indicative of interactions of a customer at a physical storefront of the enterprise, such as (i) detecting the customer entering a physical storefront, (ii) detecting the customer's presence at a first specific region of the storefront and a respective dwell time at the first specific region, (iii) subsequently detecting the customer's presence at a second specific region of the storefront, and detecting the customer accessing a client application associated with the enterprise and searching for a product while the customer remains at the second specific region, (iv) detecting the customer purchasing, at a point-of-sale register, a product from a respective inventory of the physical storefront and at a respective price, (v) detecting the respective time intervals from the customer arriving at the second specific location to accessing the enterprise application, from accessing the enterprise application to leaving the second specific region, and from leaving the second specific region and purchasing the product, and (vi) detecting the customer exiting the physical storefront. To enable detection of these interactions with the physical storefront, the customer may need to have "opted-in" to sharing the customer's location with the enterprise (e.g., via the client application 187).

The customer data 122 may include user profile data, which may include a plurality of profiles of a plurality of users associated with the enterprise. Each user profile may be associated with a particular individual user, and each user may be uniquely identified by a user identifier. For example, a user identifier may be a set of alphanumeric and/or other types of characters that are assigned by the enterprise to uniquely identify a particular user to the enterprise. Each user profile may store data corresponding to its respective user, such as his or her login credentials (e.g., user login name, password, passphrase, passcode, answers to security questions, biometric data, etc.), contact information (e.g., address, phone numbers, email addresses, etc.), account information, user preferences, purchase history, claim history, stored payment options, prescriptions that have been ordered and filled (if the enterprise is a pharmacy), rewards and/or loyalty account data, and/or similar information indicative of transactions and/or interactions between the respective user and the enterprise (e.g., interactions that have taken place via a website of the enterprise, via instances of a client application (e.g., a client application 187) of the enterprise, via in-person visits to storefront locations of the enterprise as indicated by local storefront computing devices, via email, via chat, etc.).

The historical data 124 includes data indicative of a plurality of historical interactions of a plurality of customers with the enterprise. The historical data 124 may also include data indicative of and associated with products provided by the enterprise, for example, product identifiers, product list prices, product sell-through prices, product profit margins, revenue generated from the sale of products, decays of inventories of products at various enterprise locations, changes in list prices of products over time, incentives that were offered and/or accepted with respect to certain products, related products, times/days/dates corresponding to collected product data, etc. Additionally or alternatively, types of data included in the historical data 124 may include data indicative of and associated with enterprise locations, such as products offered, inventories, decays of inventories over time, location sell-through, location generated revenue, location profit margin, promotions and other incentives offered at the locations, times/days/dates corresponding to collected location data, etc.

Further, the types of data included in the historical data 124 may include historical data indicative of different types of incentives for different products, different values of the different incentives, different time-to-lives (TTLs) of the different incentives, and resulting outcomes of various combinations of the same (e.g., incentive resulted in a sale of a product at a respective price within a respective time interval, incentive resulted in a sale of another product at a respective price within a respective time interval, incentive did not result in any sale, etc.). Types of data included in the historical data 124 may also include maximum sell-through data and/or maximal revenue data of various enterprise locations for various conditions, such as dates, products, seasons, promotions, prices, incentives, and the like. Of course, other data that is indicative of and associated with customers, customer interactions or engagements with the enterprise, products provided by the enterprise, location performance, and incentives may be included in the historical data 124 and/or the customer data 122.

The historical data 124 may be divided into multiple data sets. For example, a first set of the historical data 124 may be training data used to train one or more models, and a second set of the historical data 124 may be validation or test data used to verify predictions of the trained models. All or a portion of the historical data 124 may be stored on the memory 114 of the offer recommendation server 110. Alternatively or in addition, all or a portion of the historical data 124 may be stored within a database from which the offer recommendation server 110 can retrieve or access the historical data 124.

The database server 130 includes one or more processor(s) 132 and a memory 134, which may be similar to the processor(s) 112 and the memory 114, respectively. The database server 130 operates a database for storage of offers generated by the offer recommendation server 110. The database may include one or more of a structured query language (SQL) database, a NoSQL database, a flat file storage system, or any other suitable data storage system or configuration. In particular, the database server 130 implements a database application 136, which may be stored as executable instructions on the memory 134. The database application 136 is configured to create, receive, update, and/or retrieve records related to the techniques disclosed herein. For example, the database application 136 is configured to manage data stored at the database server 130, to receive and respond to requests for data, and to manage incoming data. Although referred to herein as a singular database application 136, the database application 136 may include a plurality of applications and/or modules that perform different functions of the database application 136.

In some implementations, the database server 130 may receive offers from the offer recommendation server 110, and use these offers to build a staged offer data set 137, which may be stored on the memory 134. The database server 130 also stores a deployed offer data set 138. If the database server 130 receives a request for offers, the database application 136 retrieves offer data from the deployed offer data set 138. After the staged offer data set 137 is built (i.e., after all offer data for a subset of customers preconfigured by the offer recommendation server 110, or the database server 130, has been loaded into the staged offer data set 137), the database application 136 can swap the deployed offer data set 138 with the staged offer data set 137. Alternatively or in addition, the swap can take place at predetermined times, or after a predetermined period of time after the previous swap. In some embodiments, the database server 130 may maintain the deployed offer data set 138 without also storing the staged offer data set 137. In such embodiments, offers received at the database server 130 from the offer recommendation server 110 can be directly loaded into the deployed offer data set 138. The deployed offer data set 138 includes, for each customer of a plurality of customers, the offers that have been generated for that customer. The deployed offer data set 138 is updated (e.g., by a direct load from the offer recommendation server 110 or by being swapped with the staged offer data set), such that the offers included in the deployed offer data set represent the most-recently generated offers for a customer that are ready to be provided to the customer.

The API server 140 includes one or more processors 142 and a memory 144, which may be similar to the processor(s) 112 and the memory 144, respectively. The API server 140 implements an offer API 146, which may be stored as executable instructions on the memory 144. The offer API 146 is configured to facilitate interactions between the delivery server 150 and the database server 130 (or, more particularly, between a delivery application 156 and a database application 136). For example, the offer API 146 may be configured to receive requests for offers from the delivery server 150 and to receive generated offers from the database server 130. The offer API 146 may also interact with other components of the computing system 100, such as the offer recommendation server 112, the content server 160, the campaign server 170, and the client device 180. Although referred to herein as a unitary API, the offer API 146 may include a plurality of separate APIs 146 that may perform different functions of the offer API 146 or receive certain predefined types of requests from the components of the computing system 100 and to provide certain predefined responses to such components. The offer API 146 may be implemented as, for example, a Representational State Transfer (REST) API. Computing devices of the computing system 100 may interact with the API server 140 via the offer API 146 using HTTP GET and POST requests, for example.

The delivery server 150 includes one or more processors 152 and a memory 154, which may be similar to the processor(s) 112 and the memory 114, respectively. The delivery server 150 implements a delivery application 156, which may be stored as executable instructions on the memory 154. The delivery application 156 is configured to deliver communications to client devices, such as the client device 180. As will be discussed in further detail below, the communications may be formatted in accordance with a template, but may be only partially populated or not populated with content before being provided to the client device 180.

The content server 160 includes one or more processors 162 and a memory 164, which may be similar to the processor(s) 112 and the memory 114, respectively. The content server 160 may implement software applications and/or APIs configured to interact with other components of the computing system 100 and to perform the techniques of this disclosure. The content server 160 stores (or otherwise has access to) content associated with the offers and products of the enterprise. For example, a particular offer may be for a 10% discount, and may be associated with a particular product. The content server 160 stores imagery associated with the particular offer and/or the particular product. The delivery server 150, upon receiving an identification of the particular offer and the particular product via the offer API 146, can query the content server 160 for content corresponding to the particular offer and the particular product. Thus, when a client device 180 accesses the communication, the delivery server 170 can populate the communication using the content, as will be discussed in further detail below.

The campaign server 170 includes one or more processors 172 and a memory 174, which may be similar to the processor(s) 112 and the memory 114, respectively. The campaign server 170 may implement software applications and/or APIs configured to interact with other components of the computing system 100 and to perform the techniques of this disclosure. The campaign server 170 provides templates for a communication of the enterprise to the delivery server 150. Further, the campaign server 170 also provides, to the delivery server 150, user identifiers of customers to which communications should be directed. For example, the campaign server 170 may provide an email template for an email campaign of the enterprise to the delivery server 150 for delivery to customers. The templates may be organized into sections referred to in this disclosure as "zones." Each communication may be associated with a particular campaign (e.g., an advertising campaign) of the enterprise. The template may indicate a campaign code identifying the campaign.

The client device 180 may be, for example, a personal computer, a cellular phone, a smart device, a mobile communications device, a tablet, a laptop, another type of handheld electronic device, a desktop computer, etc. A user of the client device 180 can interact with the enterprise (i.e., the enterprise associated with the offer recommendation server 110) by operating the client device 180. The client device 180 includes one or more processor(s) 182 and a memory 184, which may be similar to the processor(s) 112 and the memory 114, respectively. Similar to the offer recommendation server 110, the client device 180 may include components not shown in FIG. 1, such as a display, an I/O interface, an OS, and/or one or more communication interfaces enabling communication via the network 102.

The client device 180 may implement one or more applications, which may be stored as executable instructions on the memory 184. For example, the client device 180 may implement an email application 185 configured to access, display, and transmit email. The client device 180 may also implement a web application 186 enabling the client device to access websites, such as a website of the enterprise. Further, the client device 180 may also implement a client application 187 of the enterprise, which may enable a user to manage a user profile associated with the enterprise, shop for products offered by the enterprise, place orders for the products, view advertisements of the enterprise, etc. As mentioned above, the user and the user profile may be associated with a user identifier that uniquely identifies the user to the enterprise. If the user is opted-in to share location data with the enterprise, the enterprise may also receive location data from the client device 180 via the client application 187.

The client device 180 also includes a user interface 188. The user interface 118 includes hardware, firmware, and/or software configured to enable a user to interact with (i.e., both provide inputs to and perceive outputs of) the client device 102. For example, the user interface 188 may include a touchscreen with both display (e.g., video display device) and manual input capabilities. A user may interact with the user interface 188 to provide inputs to applications of the client device, such as the email application 185, the web application 186, and the client application 187, and to perceive outputs of the applications. For example, the applications 185, 186, and 187 may implement graphical user interfaces (GUIs) that the client device 180 can display and that a user can interact with via the user interface 188.

Example Methods

Figure 2:
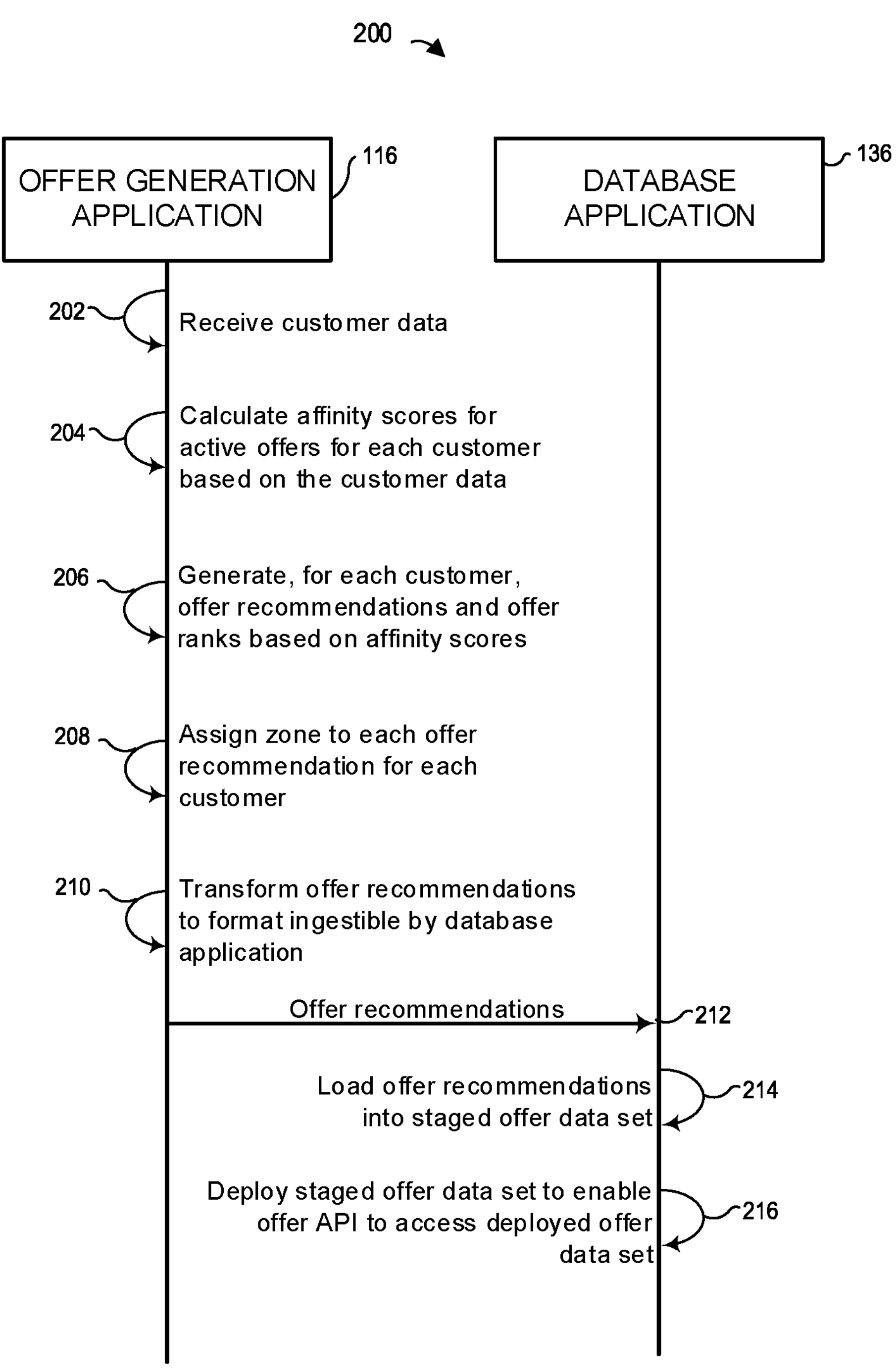
FIG. 2 is a messaging diagram of an example scenario in which a database application receives offer recommendations personalized for users, in accordance with some embodiments.
Figure 3:
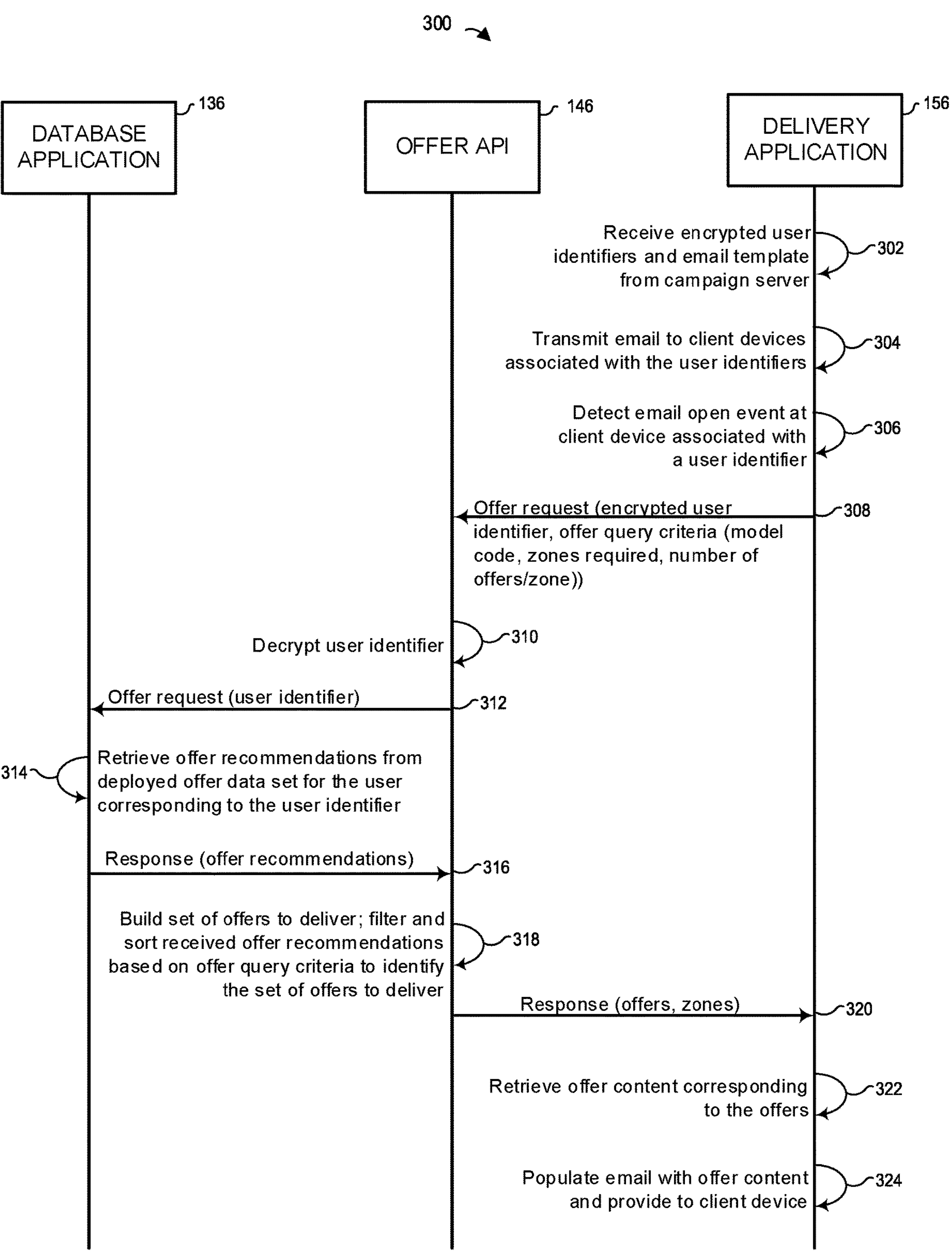
FIG. 3 is a messaging diagram of an example scenario in which an offer application programming interface (API) communicates with a database application to retrieve personalized offer recommendations and to facilitate on-demand population of a communication based on the personalized offer recommendations, in accordance with some embodiments.

FIGS. 2-3 illustrate example messaging sequences during preparation and transmission of a communication comprising an email. It should be understood that FIGS. 2-3 represent example information flows, and that other information flows are also possible for other scenarios that involve other communications/content delivery methods in addition to or instead of email communications. Examples of these other information flows will be discussed in more detail with reference to FIG. 4, and where appropriate within the descriptions of FIGS. 2-3.

FIG. 2 is a messaging diagram of an example scenario 200 in which the database application 136 receives offer recommendations personalized for users. Initially, the offer generation application 116 receives 202 the customer data 122. The customer data 122 represents prior customer interactions of the customer with an enterprise, as discussed above. Based on the customer data 122, the offer generation application 116 calculates 204 affinity scores for active offers, for each customer indicated by the customer data 122 (or for each customer of a predefined subset of the customers indicated by the customer data 122, such as active customers that have opted-in to interactions with the enterprise). Active offers are offers that currently being provided by the enterprise (i.e., that are being provided by the enterprise when the offer is generated, or that will be provided by the enterprise within a predetermined time period from the offer being generated). The offer generation application 116 can access the available offer data 126 to determine the offers that are active for the enterprise. Each offer may be associated with a start date or a time range during which the offer is available.

To calculate the affinity scores, the offer generation application 116 applies one or more models, such as the champion model 118 or the challenger model 120, to the customer data 122. The offer generation application 116 may calculate one or more sets of affinity scores. For example, the offer generation application 116 may calculate a first set of affinity scores using the champion model 118, and may calculate a second set of affinity scores using the challenger model 120. Further, the offer generation application 116 may calculate different types of affinity scores, such as offer affinity scores, product affinity scores, and category affinity scores.

An offer affinity score represents an affinity of a customer for the offer (e.g., a customer's affinity for a price discount, a loyalty reward, a free or discounted additional product, etc.), where a customer's affinity for the offer represents how incentivizing the offer is estimated to be for the customer. For example, the offer affinity score may represent a predicted likelihood that the offer will cause the customer to interact with the enterprise, where a high offer affinity score indicates a high customer affinity. Similarly, the offer generation application 116 may also calculate a product affinity score associated with the customer's affinity for a product (i.e., how incentivizing an offer for the product is estimated to be, and/or a quantitative measure of the customer's preference for the product). The offer generation application 116 can calculate product affinity scores for a subset of the total products offered by the enterprise. For example, the offer generation application 116 can calculate product affinity scores for items eligible to be associated with one or more active offers. Further, the offer generation application 116 may calculate a category affinity score associated with the customer's affinity for a category of products (e.g., home, beauty, grocery, health, pharmacy, etc.). Some offers may be relevant only for certain categories of products. In addition, the offer generation application 116 may calculate a zone affinity score associated with the customer's affinity for a zone of a communication. The affinity scores may be based on a quantitative score (e.g., from 0 to 100, with 100 corresponding to the highest possible estimated affinity).

Based on the affinity scores, the offer generation application 116 generates 206, for each customer, offer recommendations and offer ranks. To generate an offer recommendation for a customer, the offer generation application 116 selects an offer based on the customer's offer affinity score associated with the offer. If the offer is associated with a product, then the offer generation application 116 also assigns a product to the offer recommendation. The offer generation application 116 assigns a product to the offer recommendation based on the customer's product affinity scores. Thus, if there are multiple possible products that may be associated with a particular offer, then the offer generation application 116 assigns a product to the offer recommendation having a highest product affinity score of the possible products. The offer generation application 116 can also select offers and/or products based on the customer's category affinity scores. Accordingly, each offer recommendation for a customer includes an offer and any associated products, which are selected by the offer generation application 116 based on affinity scores of the customer. Each offer recommendation may also include the offer affinity score, product affinity score, category affinity score, and/or zone affinity score of the offer, product, category, and zone corresponding to the offer recommendation.

The offer generation application 116 may calculate a predetermined number (e.g., 10, 100, 500, 1000, etc.) of offer recommendations, depending on the particular implementation. For example, if the offer generation application 116 is configured to calculate 500 offer recommendations, the offer generation application 116 can select 500 offers with the 500 highest offer affinity scores. Further, the offer generation application 116 may be configured a predetermined number of offer recommendations or a predetermined number of offer recommendations per category based on requirements of expected communications. Requirements of expected communications (e.g., requirements of a template weekly e-mail), may be set by the campaign server 170 and passed to the offer generation application 116.

Further, the offer generation application 116 also generates a rank of each offer recommendation, where a rank of "1" corresponds to the lowest-ranking offer recommendation. The rank of an offer recommendation corresponds to the offer affinity score of the offer for the customer, such that a lower rank corresponds to a higher offer affinity score.

In some implementations, the offer generation application 116 may generate the offer recommendations using a different method than calculating affinity scores. For example, the offer generation application 116 may apply a model to the customer data 122, and the output of the model may be the offer recommendations for each customer. The offer recommendations may be generated in any manner that results in offer recommendations specific to each customer, based on data available for the customer.

The offer generation application 116 also assigns 208 one or more zones to each offer recommendation for each customer. Some offer recommendations may only be assignable to a particular zone. Other offer recommendations may be assignable to multiple zones. Therefore, for different customers, the offer generation application 116 may assign different zones to similar recommended offers depending on the customers' respective affinity scores and offer ranks. The zones may correspond to different sections of a communication template. For instance, the offer generation application 116 may receive an indication of the zones from the campaign server based on a communication template generated by the campaign server. For example, if the communication is an email, a first zone may correspond to a first part of the email, such as the top-most section of the email body. A second zone may correspond to a second part of the email, and so on. The zones may also be associated with categories of products. For example, a first zone may be associated with household products, a second zone may be associated with grocery products, and a third zone may be associated with personal care items. In some implementations, the offer generation application 116 may omit assigning the zones (e.g., in implementations where communications including the offers will include only one zone).

Further, the offer recommendations may include an indication, such as a flag, indicating whether the user has previously interacted with the offer, or a similar offer (e.g., an offer of the same type, such as a discount, loyalty reward, incentive for purchasing a similar product, etc.).

Next, the offer generation application 116 transforms 210 the offer recommendations to a format ingestible by the database application 136. This transformation process can include one or more steps that vary by implementation and the formatting requirements of the database application 136. In an example embodiment, the transformation includes generating, for each customer, an offer recommendation data structure (e.g., a JavaScript Object Notation (JSON) object) including the offer recommendations for the customer. The offer recommendation data structure indicates, for each recommended offer generated for the customer, any associated products assigned to the offer, an offer rank, and any zones assigned to the offer. The offer generation application 116 therefore may generate a set of offer recommendation data structures including offer recommendation data structures for all customers indicated in the customer data 122. As part of the transformation process, the offer generation application 116 may filter this set of data structures to a smaller set of data structures for active customers that have opted in to communications with the enterprise. Further, the transformation process may include reducing the total number of offer recommendations for each customer. For example, while the offer generation application 116 may generate 500 offer recommendations for each customer, the offer recommendation data structure for each customer may only include 100 offer recommendations. The offer generation application 116 may determine which offer recommendations to include in the offer recommendation data structure based on the offer ranks of the offer recommendations. The number of offer recommendations that the offer generation application 116 includes in each offer recommendation data structure can depend on the estimated number of offers required for a communication template.

Offer recommendations may be stored within an offer recommendation data structure as an offer identifier, also referred to in this disclosure as an "offer key," that uniquely identifies the offer associated with the offer recommendation. The offer key may be an alphanumeric string, for example. Similarly, products may also be uniquely identified using a product identifier or product code. If a product is assigned to the offer recommendation, then the product code may be appended to the offer key.

Each offer recommendation data structure is associated with a user identifier of the corresponding customer, and the user identifier may be included within the offer recommendation data structure. Before including the user identifier in the offer recommendation data structure, the offer generation application 116 may encrypt the user identifier using an encryption algorithm (e.g., an Advanced Encryption Standard (AES) algorithm).

Further, the transformation process may also include applying a compression algorithm to the offer recommendation data structures in order to reduce the size of the offer recommendation data structures. This compression step results in less data to later transmit and store, which in turn increases the speed at which offer recommendations can be loaded into the database server 130 and increases the efficiency of the database application 136 operations discussed below.

Next, the offer generation application 116 transmits 212 (or otherwise transfers) the offer recommendations to the database application 136 executing on the database server 130. More particularly, the offer generation application 116 transmits 212 the transformed offer recommendations (e.g., the offer recommendation data structures) to the database application 136. In order to interact with the database application 136, the offer generation application 116 may be required to present security keys to the database application 136. The database application 136 loads 214 the offer recommendations into the staged offer data set 137 of the database server 130. When all offer recommendations have been loaded into the staged offer data set 137, after a predetermined period of time after starting the loading process, at a predetermined time, or after another suitable trigger event, the database application 136 deploys 216 the staged offer data set 137. To deploy 216 the staged offer data set 137, the database application 136 can swap the staged offer data set 137 into the deployed offer data set 138. The deployed offer data set 138 is the source from which the offer API will later retrieve offers, as discussed with reference to FIG. 3. While the staged offer data set 137 is being loaded, the offer API can access an existing deployed offer data set 138.

Turning to FIG. 3, the offer API 146 delivers offers to the delivery application 156 in a scenario 300. The scenario 300 can take place after the offer data set 138 is deployed. While the scenario 300 is occurring, another staged offer set may be being generated and loaded into the database server 130, in accordance with FIG. 2.

The scenario 300 illustrates an example messaging sequence in which the delivery application delivers a communication comprising an email to the client device 180. As will be discussed with reference to FIG. 4, an email is one example communication. The techniques of this disclosure can be applied to other suitable communication channels, such as text messages, websites, digital advertisements, in-store advertisements, an instance of a GUI of an application, etc.

Initially, the delivery application 156 receives 302 encrypted user identifiers and an email template from the campaign server 170. The encrypted user identifiers identify customers to which the delivery application 156 is to transmit emails formatted in accordance with the email template. The campaign server 170, for example, may be associated with the enterprise and can determine which customers are to be sent the email. The campaign server 170 may encrypt the user identifiers prior to transmitting the user identifiers to the delivery application 156. The delivery application 156 may be owned and/or operated by an entity different from the enterprise, and therefore the campaign server 170 can encrypt the user identifiers to maintain the privacy of the customers.

The email template identifies the zones of the email and the locations of the zones within the email. The zones of the email correspond to the layout of the email (e.g., a first zone may be the top-most section of the email body, a second zone may be the second section of the email, and so on, as discussed above). The email template also identifies, for each zone, how many offers are to populated and the locations of the offers within the zone.

In addition to the user identifiers and the email template, the delivery application 156 may receive other criteria for the email from the campaign server 170. For example, the other criteria may indicate which model (e.g., the champion model 118 or the challenger model 120) should be used to generate the offers that are populated into the email. The other criteria may also indicate a time at which the emails should be transmitted to the customers. As another example, the other criteria may indicate product categories that should be preferred for the email and/or zones of the email. The other criteria may also indicate a preference for whether the user has previously interacted with offers that are the same as or similar to offers that will be populated into the email.

Next, the delivery application 156 transmits 304 emails formatted in accordance with the email template to the client devices (e.g., the client device 180) associated with the received user identifiers. For example, the delivery application 156 may have access to a list of email addresses corresponding to the user identifiers, and/or the campaign server 170 may provide the email addresses to the delivery application 156 with the user identifiers. The email that is transmitted includes sections that are not populated with content. These sections correspond to the zones that will later be populated with content corresponding to offers received from the offer API 146. The email may be partially populated. For example, an email header and/or email closing of the email may be populated with generic text and/or imagery.

After transmitting 304 the emails, the delivery application 156 detects 306 an email open event at the client device 180 associated with a user identifier. The email open event corresponds to the delivery application 156 detecting that the client device 180 is accessing, or attempting to access, the email. More generally, the email open event is an example of a delivery event corresponding to the delivery application 156 detecting that the client device 180 is accessing a communication transmitted by the delivery application 156 to the client device 180.

In response to detecting 306 the email open event, the delivery application 156 invokes 308 the offer API 146 to request offers for the customer associated with the user identifier. Generally speaking, the request for offers is a request for the offer keys associated with offers that have been personalized for the user. Within the request, the delivery application 156 includes the encrypted user identifier associated with client device 180 and offer query criteria. The offer query criteria may include a preferred model code indicating which model (e.g., the champion model 118 or the challenger model 120) should be used to generate the offers that are populated into the email. For example, the model code may be a binary variable, where "0" indicates the champion model 118, and "1" indicates the challenger model 120. The offer query criteria also includes the number of zones required for the email, where the number of zones is based on the email template. Further, the offer query criteria includes the number of offers per zone that are required for the email. If any of these fields (e.g., the model code, the zones required, or the number of offers per zone) are not included in the request, the offer API 146 may utilize default values. The offer query criteria may also include an order in which the set of offers should be returned. For example, the offer query criteria may indicate that the set of offers should be sorted by ordered by zone, and rank within zone. Alternatively, the offer query criteria may indicate that the set of offers should be sorted by rank, independent of zone. As another example, the offer query criteria may indicate that the zones should be sorted based on zone affinity score.

Further, the offer query criteria may indicate preferred product categories to which the offers should correspond. For example, the offer query criteria may indicate that the email and/or certain zones of the email should be populated using offers corresponding to certain categories of products. Still further, the offer query criteria may indicate a preference regarding whether the user has previously interacted with the offers and/or similar offers that will be populated into the email. Said another way, the offer query criteria may indicate a preference for receiving offers that are similar to offers that were previously delivered to a user.

The offer API 146 receives 308 the request and may decrypt 310 the user identifier to determine the customer for which the offer API 146 should retrieve the offers. The offer API 146 transmits 312 an API request to the database application 136. The API request may include the decrypted user identifier associated with the client device 180. Alternatively, in some implementations, the offer API 146 does not decrypt the user identifier, and the user identifier remains encrypted when the offer API 146 transmits 312 the API request to the database application 136 including the user identifier. The database application 136 retrieves 314 the offer recommendations from the deployed offer data set 138 for the user corresponding to the user identifier. For example, the database application 136 can retrieve the offer recommendations stored within the offer recommendation data structure for the user. The database application 136 can then transmit 316 a response to the API request to the offer API 146. Each offer recommendation may include the offer associated with the offer recommendation (which may be identified using an offer key), a product (which may be identified using a product code, which may be appended to the offer key), one or more zones associated with the offer recommendation, a rank of the offer recommendation, an indication of the model used to generate the offer recommendation (e.g., the champion model 118 or the challenger model 120), and affinity scores of the user. The offer recommendations may include a first set of offer recommendations generated by the champion model 118, and a second set of offer recommendations generated by the challenger model 120. In some implementations, the database application 136 includes in the response to the API request the offer recommendation data structure. In such implementations, the offer API 146 can decompress the offer recommendation data structure.

Next, the offer API 146 builds 318 a set of offers to deliver to the delivery application 156. To build the set of offers, the offer API 146 processes the received offer recommendations in order to identify the set of offers, from the received offer recommendations, to deliver to the delivery application 156. The offer API 146 can process the received offer recommendations based on the offer query criteria in order to build a set of offers that conforms to the offer query criteria.

Processing the received offer recommendations may include filtering the offer recommendations using the offer query criteria. For example, if the request the offer API 146 receives 308 from the delivery application 156 indicates a preferred model code, the offer API 146 can filter the offer recommendations based on which model generated the offer recommendations (i.e., the champion model 118 or the challenger model 120). Accordingly, the set of offers includes the offer recommendations generated using the preferred model. As another example, the offer API 146 can filter the offer recommendations based on the zones requested by the delivery application 156, and based on the number of offers required per zone. For example, if the offer recommendations includes offer recommendations for a first zone, a second zone, and a third zone, but the offer query criteria indicates that offers are only needed for the first zone and the second zone, then the offer API 146 can filter out offer recommendations corresponding to the third zone. Further, if only two offers are needed for a first zone, then the offer API 146 may filter out all but two of the offer recommendations for the first zone. The offer API 146 can filter based on number of offers per zone using the offer ranks. In the previous example, the offer API 146 can select the offer recommendations for the first zone that have the top two ranks. As another example, the offer API 146 can filter the offer recommendations based on the timestamp of the offer request 308 and the time during which the offer is available. If the offer associated with the offer recommendation has expired, or is not yet available, the offer API 146 can filter out the offer recommendation from the set of offers.

If the offer query criteria includes preferred product categories, the offer API 146 can further filter offer recommendations that are associated with products that fall within the preferred product categories. Each offer recommendation, for example, may include an indication of a category of products to which the offer recommendation corresponds. The offer API 146 can filter the offer recommendations by comparing the product categories of the offer recommendations to the preferred product categories indicated by the offer query criteria.

If the offer query criteria indicates a preference regarding previous user interactions, the offer API 146 can further filter the offer recommendations based on whether the user has previously interacted with the offers (or similar offers) of the offer recommendations (e.g., based on an indication or flag included in the offer recommendations).

Processing the received offer recommendations can also include sorting the offer recommendations. Generally speaking, the offer API 146 can sort the offers in accordance with the offer query criteria. By default, for example, the set of offers can be sorted by zone, such that the first subset of offers in the set of offers correspond to the first zone, the second subset of offers in the set of offers correspond to the second zone, and so on. The set of offers can be also be sorted by rank. More specifically, the set of offers may be sorted by rank within a zone. For instance, the first subset of offers can be sorted by rank (e.g., from the lowest ranked offer in the zone to the highest ranked offer in the zone), the second subset of offers can be sorted by rank, and so on. The set of offers can also be sorted by product categories and/or previous customer interactions with the offers. Further, the set of offers can be sorted based on affinity scores (e.g., offer, product, category, and/or zone affinity scores). If a category or zone affinity score of the user indicates that the customer is more likely to interact with offers of a certain category or zone, the offer API 146 can return offers sorted based on category and/or zone affinity score, which may cause the delivery application 156 to re-order the template such that a zone or category for which the customer has a higher affinity score appears earlier in the communication, or in a location of the communication more likely to be seen by the user (e.g., at a higher portion of an email).

After building the set of offers, the offer API 146 transmits 320 a response to the delivery application 156 (i.e., a response to the request that the offer API 146 receives 308). The response includes the set of offers (i.e., the offer keys corresponding to the offers, product codes corresponding to the offers, and zones for the offers). In some implementations, the response may also include the ranks of the offers. However, if the offer API 146 previously sorted the set of offers by rank, then the response may omit the ranks. Similarly, the response may also omit the zones of the offers if the set of offers has been filtered to include only the number of offers required per zone, and has been sorted by zone.

The delivery application 156 can then retrieve 322 offer content corresponding to the offers in the set of offers. To retrieve the offer content, the delivery application 156 may call other APIs or applications. For example, the delivery application 156 may request the offer content from the content server 160 (e.g., by calling an API implemented by the content server 160). To request the offer content, the delivery application 156 may provide the content server 160 with the offer keys and/or product codes corresponding to the offers. The content server 160 can then retrieve the offer content and provide the offer content to the delivery application 156. The offer content includes imagery corresponding to the offer and any associated products. For example, if a product code assigned to an offer is for a detergent, the offer content may include an image of the detergent. To provide the offer content to the delivery application 156, the content server 160 may provide the delivery application 156 with metadata corresponding to the offer content.

Next, the delivery application 156 populates 324 the email with the offer content in accordance with the email template. The delivery application 156 populates the email based on the zones of the email template. Based on the order of the offers in the set of offers (and/or based on an explicit indication of the corresponding zones and ranks), the delivery application 156 determines where each offer should appear within the email. The delivery application 156 then determines the offer content corresponding to each offer, and populates the offer content into the email at the appropriate location in the template.

After the delivery application 156 populates the email with the offer content, the client device 180 displays the email including the offer content (e.g., via the user interface 188).

The events 306, 308, 310, 312, 314, 316, 318, 320, 322, and 324 each occur between when a user of the client device 180 interacts with the client device 180 to open the email, and when the client device 180 displays the email. Accordingly, these events can be described as occurring in "real-time," (e.g., within one second).

As mentioned above, the messaging sequences illustrated in FIGS. 2 and 3 have several advantages. Because there is both a staged offer data set 137 and a deployed offer data set 138, the staged offer data set 137 can be built while the deployed offer data set 138 is deployed and actively being accessed by the offer API 146. When ready, the staged offer data set 137 can be swapped with the deployed offer set 138, and the newly-generated offer recommendations made available to the offer API 146. This technique improves scalability, as an active data set (i.e., the deployed offer data set 138) is accessible by the offer API 146 while a large amount of data is being loaded into the staged offer data set 137. The offer API 146 is also able to retrieve offer recommendations that have been pre-generated and transformed into an ingestible format by the offer generation application 116 and that are specific to the user, thereby avoiding needing to parse all available customer data when responding to a request from the delivery application 156.

Further, because the email is populated using offers retrieved by the offer API 146, the email, when displayed, includes content for the user that is both (i) personalized for the user, and (ii) personalized based on recently-available data. In an example scenario, the delivery application 156 may transmit 304 the email to the client device 180. Prior to, or after, the delivery application 156 transmitting 304 the email, the user associated with the client device 180 may interact with the client application 187 to purchase a product from the enterprise. The user's purchase may be incorporated into the customer data 122, and used by the offer generation application 116 to generate 206 an offer recommendation based on the customer data 122. The offer recommendation can then be loaded 214 into the staged offer data set 137 and deployed in the deployed offer data set 138. When the user accesses the email, the delivery application 156 will detect 306 an email open event, invoke the offer API 146 to request offers, and receive offers from the offer API 146. If the user accesses the email after the offer recommendation is included in the deployed offer set 138, then the offer API 146 will retrieve the offer recommendation generated based on the user's recent purchase. When the client device 180 displays the email, the displayed content will be for the newly-generated offer recommendation. Depending on when the user access the email, the customer interaction may be within a short period of time (e.g., within 24 hours, within 72 hours, etc.) before, or after, the email was transmitted. How quickly after a customer interaction that an offer recommendation based on the customer interaction is available to the offer API 146 depends on the implementation (i.e., the duration of time required to include the interaction in the customer data 122, generate the offer recommendation, load the offer recommendation into the staged offer data set 137, and deploy the offer recommendation within the deployed offer data set 138). In some implementations, offer recommendations generated based on customer interactions are made available to the offer API in near real-time, where near real-time in this context refers to the offer recommendations being generated within a short time of the customer interactions (e.g., within a second, a minute, or an hour).

Figure 4:
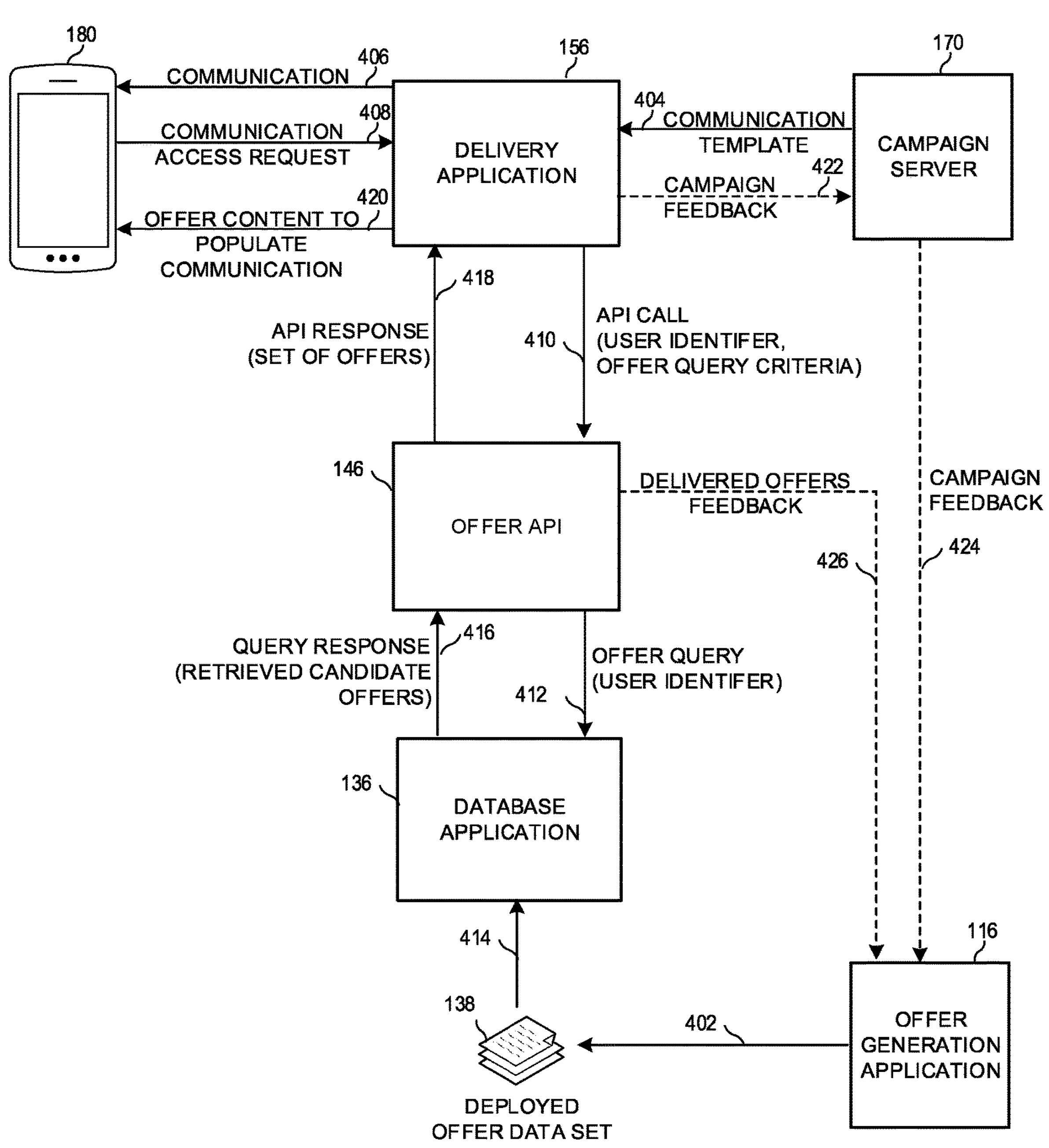
FIG. 4 is a block diagram of an example information flow through the devices of the exemplary system depicted in FIG. 1, in accordance with some embodiments.

FIG. 4 is a block diagram of an example information flow 400 through the devices of the exemplary system depicted in FIG. 1. The information flow 400 is a combination of the messaging sequences discussed with reference to FIGS. 2-3 and provides an overview of the techniques of this disclosure. Further, the information flow 400 can apply to any suitable communication (e.g., an email, a text message, a webpage, etc.)

Initially (or at least before a delivery event corresponding to event 408, to be discussed below), the offer generation application 116 generates offer recommendations, also referred to in this disclosure as candidate offers, personalized for specific users. These offer recommendations are transferred 402 to the database server 130 and deployed within the deployed offer data set 138 (e.g., as offer recommendation data structures for a plurality of users). In addition, the campaign server 170 transmits 404 a communication template to the delivery application 156. The communication template may include zones of the communication template to be populated with offer content and a number of offers per zone. In some implementations, the communication template is an email template indicating zones of an email to be populated with offers and a number of offers per zone. In other implementations, the communication template is a text message (i.e., a short message service (SMS) message) template. In still other implementations, the communication template is a template for a digital advertisement, such as a mobile advertisement or web advertisement, or for digital content to be displayed within an application such as the client application 187. In further implementations, the communication template is a template for a webpage or section of a webpage (e.g., a product detail page (PDP)), to be displayed by a web application, such as the web application 186. Generally speaking, the communication template can be a template (i.e., a layout to be populated with offer content) for any digital presentation of content. Said another way, the techniques of the disclosure, and in particular the functionality of the offer API 146, are not specific to a particular communication type. In some implementations, the techniques of this disclosure can also be applied to non-digital presentation of content. For example, offers and offer content can be retrieved for a printable template, and the printable template can be populated based on the retrieved offers, printed, and delivered to specific users.

The delivery application 156 transmits 406 the communication, formatted in accordance with the communication template, to the client device 180. At a later time, the client device 180 transmits 408 a communication access request to the delivery application 156. The communication access request signals to the delivery application 156 that the client device 180 is accessing the communication, and corresponds to a delivery event. In the context of the scenario 300, this delivery event is an email open event. In response to detecting the delivery event, the delivery application 156 invokes 410 the offer API 146 using an API call. The API call (i.e., a request formatted in accordance with the offer API 146) includes a user identifier of the user associated with the client device 180 and offer query criteria (e.g., a preferred model code, a number of zones, a number of offers per zone) based on the communication template. The user identifier may be encrypted when the offer API 146 receives the user identifier.

The offer API 146 in turn transmits 412 an offer query (i.e., an API request) to the database application 136 to retrieve offers corresponding to the user identifier. The offer query may include the user identifier. The offer API 146 may decrypt the user identifier prior to transmitting the request to the database application 136. In response to the offer query, the database application 136 retrieves 414 candidate offers corresponding to the user identifier from the deployed offer data set 138 (i.e., the offer recommendations, which may be retrieved as an offer recommendation data structure for the user). The database application 136 transmits 416 a query response (i.e., a response to the API request) including the retrieved candidate offers to the offer API 146. The offer API 146 can then process the candidate offers, in accordance with the processing steps described above with reference to event 318, to identify a set of offers. The offer API 146 provides 418 the set of offers to the delivery application 156 in an API response to the previous API call.

The delivery application 156 can identify the offers in the set of offers, and retrieve content corresponding to each offer. To retrieve the content, the delivery application 156 may invoke other APIs and/or applications, such as an API of the content server 160. The delivery application can then transmit 420 the offer content to the client device 180 in order to populate the communication with the offer content, such that the client device 180 displays the communication including the offer content.

FIG. 4 also illustrates feedback mechanisms that the computing system 100 can implement. For example, the delivery application 156 may receive campaign feedback from client devices (such as the client device 180), such as feedback indicating whether the client device 180 accessed the communication, whether a user of the client device 180 interacted with the communication (e.g., by interacting with a link included in the communication), and/or the manner and length of the user's interaction with the communication. The delivery application 156 can transmit 422 this campaign feedback to the campaign server 170, which may in turn transmit 424 the campaign feedback to the offer generation application 116. The offer generation application 116 can include this campaign feedback in the historical data 124, and use the campaign feedback to train models for generating offers (e.g., the champion model 118 and/or the challenger model 120).

Similarly, the offer API 146 can transmit 426 delivered offers feedback to the offer generation application 116. The delivered offers feedback indicates the offers that the offer API 146 included in a set of offers that were delivered to the delivery application 156 (and in turn the client device 180). The delivered offers feedback may also indicate when the set of offers were delivered by the offer API 146 to the delivery application 156. The delivered offers feedback may include encrypted, or decrypted, user identifiers. For example, if the offer API 146 and the offer generation application 116 are operated by the same enterprise, the user identifiers may be included in the delivered offers feedback in a decrypted form. The offer generation application 116 can include the delivered offers feedback in the historical data 124. Alternatively or in addition, the offer API 146 can provide the delivered offers feedback to the database application 136 and/or the campaign server 170. The database application 136, for example, can remove from the a user's offer recommendation data structure the offers that were delivered to the client device 180, such that the same offers are not later delivered to the client device in response to a second offer query.

The techniques of this disclosure can be applied to other implementations outside the specific information flow depicted in FIG. 4. For example, in an embodiment, a computing device with a display (e.g., an in-store kiosk) may be configured with a communication template (e.g., by the campaign server 170). When a user is located near (e.g., within 1 meter) the computing device, the computing device may detect the presence of the user. For the computing device to detect the user, the user may need to be opted-in to sharing location details with the computing device or the enterprise that operates the computing device. If the computing device detects the presence of the user, this detection can serve as a delivery event, which causes the computing device to invoke the offer API 146, receive offers personalized for the user, and display content corresponding to the offers.

In another embodiment, the client device 180 may be configured to directly call the offer API 146. For example, the client device 180 may receive a template for a communication (e.g., an email template, a template for a user interface of an instance of the client application 187, a webpage template, etc.) from the campaign server 170 or from another server associated with the enterprise. When a user of the client device 180 accesses the communication, the client device 180 (e.g., via the email application 185, web application 186, or client application 187) may be configured to invoke the offer API 146, receive offers, and populate content corresponding to the offers into the communication in accordance with the template (e.g., by communicating with the content server 160). In the context of a mobile advertisement, for example, the user of the client device "accessing" the communication can refer to the user of the client device accessing an instance of a GUI of an application that displays the mobile advertisement. In response to the user accessing the instance of the GUI, the client device 180 (or a server supporting the application and in communication with the client device 180) can call the campaign server 170 to retrieve the template (if the application is not pre-configured with the template), call the offer API 146, retrieve offers, and retrieve offer content. As another example, in the context of a webpage, the user of the client device 180 "accessing" the communication can refer to the user of the client device accessing a webpage. In such an example, the client device 180 may call the offer API 146 when the web application 186 opens the webpage. Alternatively, the client device 180 accessing the webpage may cause a server hosting the webpage, which acts as the delivery server 150 in this context, to call the offer API 146, retrieve offers, and retrieve content from the content server 160. The hosting server may call the campaign server 170 to retrieve a template for the webpage.

FIG. 5 is a flow diagram of an example method 500 for real-time delivery of personalized content. The method 500 may be implemented by an API server (e.g., the API server 140) implementing an API (e.g., the offer API 146). The API server can implement the method 500 as a set of instructions stored on a computer-readable memory (e.g., the memory 144) and executable by one or more processors (e.g., the processor(s) 142).

At block 502, the processor(s) detect that a delivery server (e.g., the delivery server 150) invoked an API in response to a delivery event (e.g., events 308 or 410). The delivery event corresponds to the delivery server detecting that a client device (e.g., the client device 180) is accessing a communication (e.g., an email) provided to the client device by the delivery server (e.g., events 306 or 408). The communication may be formatted in accordance with a template.

Next, at block 504, the processor(s) receive, from the delivery server via the API, a request for a set of offers (e.g., events 308 or 410). The request includes a user identifier associated with a user of the client device and offer query criteria based on the template. The user identifier included in the request may be in an encrypted form, and the processor(s) may decrypt the user identifier (e.g., event 310). The offer query criteria may include an indication of a preferred model from which offers of the set of offers should be generated. Further, the offer query criteria may include an indication of one or more zones of the communication to be populated using the set of offers, and a quantity of offers to be populated in each zone of the one or more zones.

At block 506, the processor(s) build the set of offers by: (1) retrieving, via the API, candidate offers specific to the user (e.g., offer recommendations) from a database server (e.g., the database server 130) using an API request (e.g., events 312, 316, 412, 416), and (2) based on the offer query criteria, identifying the set of offers, from the candidate offers, to deliver to the delivery server (e.g., event 318). Retrieving the candidate offers may include (1) querying, via the API, the database server for the candidate offers using the API request, where the API request includes the user identifier, and (2) receiving, via the API, the candidate offers in response to the API request. The candidate offers may be generated by a machine learning model trained on historical data (e.g., the historical data 124) indicative of a plurality of interactions of a plurality of users with an enterprise associated with the set of offers. The candidate offers may be personalized for the user because the candidate offers may be generated by applying the machine learning model to customer data (e.g., the customer data 122) representative of interactions of the user with the enterprise.

Each candidate offer may include an indication of a model (e.g., the champion model 118 or the challenger model 120) used to generate the candidate offer, candidate zones associated with the candidate offer, and a rank associated with the candidate offer. Accordingly, identifying the set of offers can include filtering the candidate offers based on whether the model, for each of the candidate offers, corresponds to the preferred model (i.e., the preferred model indicated in the offer query criteria). Identifying the set of offers can also include filtering the candidate offers by comparing the candidate zones associated with the candidate offers with the zones indicated in the offer query criteria. Further, identifying the set of offers can include filtering the candidate offers based on the quantity of offers to be populated in each zone, as indicated by the offer query criteria. Identifying the set of offers may also include sorting the candidate offers based on the ranks of the candidate offers (and/or based on the ranks of the candidate offers within each zone), and identifying the set of offers based on the sorting (i.e., selecting for the set of offers the candidate offers with the lowest ranks).

Retrieving the candidate offers may include retrieving, for each candidate offer of the candidate offers, an offer key that identifies the candidate offer and a product code that identifies a product of an enterprise that is recommended for the user. In some implementations, the product code may be appended to the offer key, such that the offer key and product code are combined into one alphanumeric string. When the processor(s) transmit the set of offers to the delivery server, the processor(s) may transmit the offer key, product code, and zones associated with each offer to the delivery server. To populate the communication with content corresponding to the set of offers, the delivery server can retrieve the content (e.g., from the content server 160) based on the offer keys and product codes.

At block 508, the processor(s) transmit, via the API, the set of offers to the delivery server to cause the delivery server to populate the communication with content corresponding to the set of offers, in accordance with the template (e.g., events 320 or 418). As a feedback mechanism, in some implementations, the processor(s) transmit, via the API, an indication of the set of offers to at least one of the database server or one or more computing devices that implement the machine learning model that generated the candidate offers (e.g., the offer recommendation server 110).

ADDITIONAL CONSIDERATIONS

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A method for real-time delivery of personalized content, the method comprising:

detecting, by one or more processors of an application programming interface (API) server implementing an API, that a delivery server invoked the API in response to a delivery event corresponding to the delivery server detecting that a client device is accessing an email provided to the client device by the delivery server, the email formatted in accordance with a template;

receiving, by the one or more processors from the delivery server via the API, (i) a request for a set of offers including a user identifier associated with a user of the client device, (ii) offer query criteria based on the template, and (iii) an indication of a preferred model from which offers of the set of offers should be generated, wherein the offer query criteria includes (a) an indication of one or more zones of the email to be populated using the set of offers and (b) a quantity of offers to be populated in each zone of the one or more zones;

building, by the one or more processors, the set of offers by:

retrieving, via the API from a database server using an API request, (i) candidate offers specific to the user that have been generated, prior to receiving the request for the set of offers, by a machine learning model trained on historical data indicative of a plurality of interactions of a plurality of users with an enterprise, the candidate offers including an incentive for the user to interact with the enterprise, and (ii) an identification of a model used to generate each of the candidate offers, wherein retrieving the candidate offers includes retrieving, for each candidate offer of the candidate offers, one or more candidate zones to which the candidate offer corresponds;

retrieving, for each of the candidate offers, a rank based on calculating at least one affinity score indicating an estimated affinity of the user for the corresponding candidate offer; and based on the offer query criteria, identifying the set of offers, from the candidate offers, to deliver to the delivery server, wherein identifying the set of offers includes filtering the candidate offers based on (i) the quantity of offers and (ii) whether the one or more candidate zones of each of the candidate offers are included in the one or more zones, and filtering the candidate offers based on whether the model, for each of the candidate offers, corresponds to the preferred model; and transmitting, by the one or more processors via the API, the set of offers to the delivery server to cause the delivery server to populate the email with content corresponding to the set of offers, in accordance with the template, wherein the client device displays the email including the content when the client device accesses the email.

2. The method of claim 1, wherein:

identifying the set of offers includes:

sorting the candidate offers based on ranks of the candidate offers; and identifying the set of offers based on the sorting.

3. The method of claim 1, wherein:

the offer query criteria includes preferred product categories to which the set of offers should correspond;

retrieving the candidate offers includes retrieving, for each candidate offer of the candidate offers, a product category of the candidate offer; and identifying the set of offers includes filtering the candidate offers based on the product categories of the candidate offers and the preferred product categories.

4. The method of claim 1, wherein receiving the user identifier includes:

receiving the user identifier in an encrypted form; and decrypting the user identifier.

5. The method of claim 1, wherein:

retrieving the candidate offers includes retrieving, for each candidate offer of the candidate offers, an offer key that identifies the candidate offer and a product code that identifies a product of an enterprise that is recommended for the user.

6. The method of claim 1, wherein retrieving the candidate offers includes:

querying, by the one or more processors via the API, the database server for the candidate offers using the API request, the API request including the user identifier; and receiving, by the one or more processors via the API, the candidate offers in response to the API request.

7. The method of claim 1, further comprising:

transmitting, by the one or more processors via the API, an indication of the set of offers to at least one of the database server or one or more computing devices that implement the machine learning model.

8. An application programming interface (API) server for real-time delivery of personalized content, the API server comprising:

one or more processors;

a non-transitory computer-readable medium; and instructions stored on the computer-readable medium that implement an application programming interface (API), wherein the instructions, when implemented by the one or more processors, cause the API server to:

detect that a delivery server invoked the API in response to a delivery event corresponding to the delivery server detecting that a client device is accessing an email provided to the client device by the delivery server, the email formatted in accordance with a template;

receive, via the API, (i) a request for a set of offers including a user identifier associated with a user of the client device, (ii) offer query criteria based on the template, and (iii) an indication of a preferred model from which offers of the set of offers should be generated, wherein the offer query criteria includes (a) an indication of one or more zones of the email to be populated using the set of offers and (b) a quantity of offers to be populated in each zone of the one or more zones;

build the set of offers by:

retrieving, via the API from a database server using an API request, (i) candidate offers specific to the user that have been generated, prior to receiving the request for the set of offers, by a machine learning model trained on historical data indicative of a plurality of interactions of a plurality of users with an enterprise, the candidate offers including an incentive for the user to interact with the enterprise, and (ii) an identification of a model used to generate each of the candidate offers, wherein retrieving the candidate offers includes retrieving, for each candidate offer of the candidate offers, one or more candidate zones to which the candidate offer corresponds;

retrieving, for each of the candidate offers, a rank based on calculating at least one affinity score indicating an estimated affinity of the user for the corresponding candidate offer; and based on the offer query criteria, identifying the set of offers, from the candidate offers, to deliver to the delivery server, wherein identifying the set of offers includes filtering the candidate offers based on (i) the quantity of offers and (ii) whether the one or more candidate zones of each of the candidate offers are included in the one or more zones, and filtering the candidate offers based on whether the model, for each of the candidate offers, corresponds to the preferred model; and transmit, via the API, the set of offers to the delivery server to cause the delivery server to populate the email with content corresponding to the set of offers, in accordance with the template, wherein the client device displays the email including the content when the client device accesses the email.

9. The API server of claim 8, wherein:

to identify the set of offers, the instructions cause the API server to:

sort the candidate offers based on ranks of the candidate offers; and identify the set of offers based on the sorting.

10. The API server of claim 8, wherein:

the offer query criteria includes preferred product categories to which the set of offers should correspond;

to retrieve the candidate offers, the instructions cause the API server to retrieve, for each candidate offer of the candidate offers, a product category of the candidate offer; and to identify the set of offers, the instructions cause the API server to filter the candidate offers based on the product categories of the candidate offers and the preferred product categories.

11. The API server of claim 8, wherein:

to retrieve the candidate offers, the instructions cause the API server to retrieve, for each candidate offer of the candidate offers, an offer key that identifies the candidate offer and a product code that identifies a product of an enterprise that is recommended for the user.

12. The API server of claim 8, wherein to retrieve the candidate offers, the instructions cause the API server to:

query the database server for the candidate offers using the API request, the API request including the user identifier; and receive the candidate offers in response to the API request.

13. The API server of claim 8, further comprising instructions that cause the API server to:

transmit, via the API, an indication of the set of offers to at least one of the database server or one or more computing devices that implement the machine learning model.

14. A non-transitory computer-readable medium storing thereon instructions that implement an application programming interface (API) for real-time delivery of personalized content, wherein the API is configured to at least:

detect that a delivery server invoked the API in response to a delivery event corresponding to the delivery server detecting that a client device is accessing an email provided to the client device by the delivery server, the email formatted in accordance with a template;

receive, from the delivery server, (i) a request for a set of offers including a user identifier associated with a user of the client device, (ii) offer query criteria based on the template, and (iii) an indication of a preferred model from which offers of the set of offers should be generated, wherein the offer query criteria includes (a) an indication of one or more zones of the email to be populated using the set of offers and (b) a quantity of offers to be populated in each zone of the one or more zones;

build the set of offers by:

retrieving, from a database server using an API request, (i) candidate offers specific to the user that have been generated, prior to receiving the request for the set of offers, by a machine learning model trained on historical data indicative of a plurality of interactions of a plurality of users with an enterprise, the candidate offers including an incentive for the user to interact with the enterprise, and (ii) an identification of a model used to generate each of the candidate offers, wherein retrieving the candidate offers includes retrieving, for each candidate offer of the candidate offers, one or more candidate zones to which the candidate offer corresponds;

retrieving, for each of the candidate offers, a rank based on calculating at least one affinity score indicating an estimated affinity of the user for the corresponding candidate offer; and based on the offer query criteria, identifying the set of offers, from the candidate offers, to deliver to the delivery server, wherein identifying the set of offers includes filtering the candidate offers based on (i) the quantity of offers and (ii) whether the one or more candidate zones of each of the candidate offers are included in the one or more zones, and filtering the candidate offers based on whether the model, for each of the candidate offers, corresponds to the preferred model; and transmit the set of offers to the delivery server to cause the delivery server to populate the email with content corresponding to the set of offers, in accordance with the template, wherein the client device displays the email including the content when the client device accesses the email.

* * * * *